June 12, 1934.　　　A. O. BUCKIUS　　　1,962,579
SIDE FRAME AND JOURNAL BOX THEREFOR
Filed Dec. 31, 1930　　　6 Sheets-Sheet 1
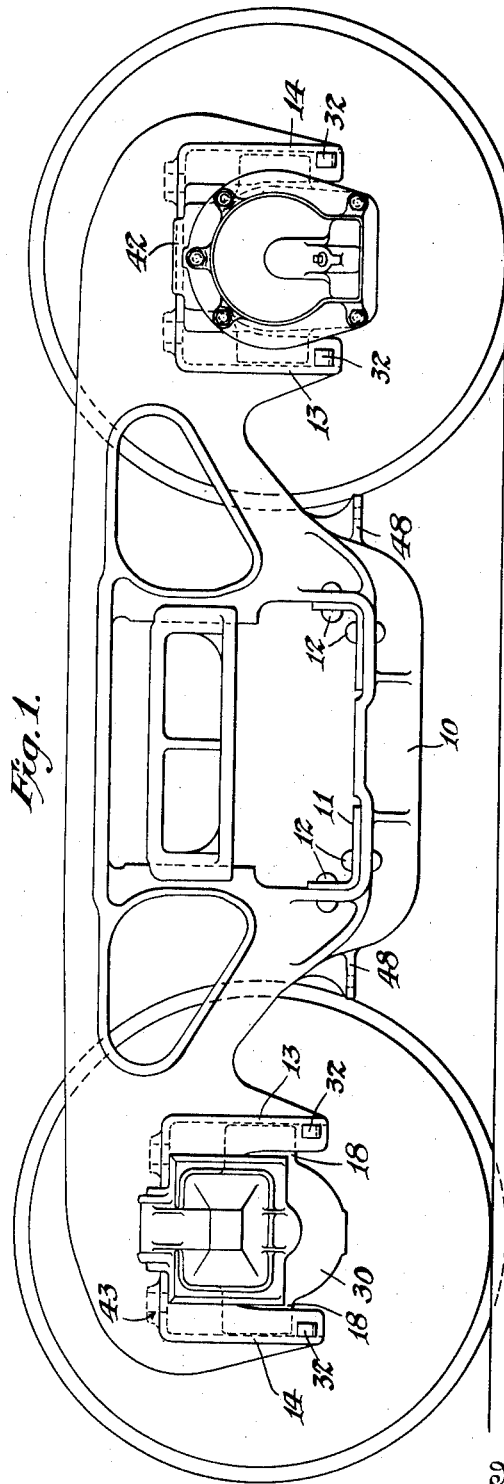
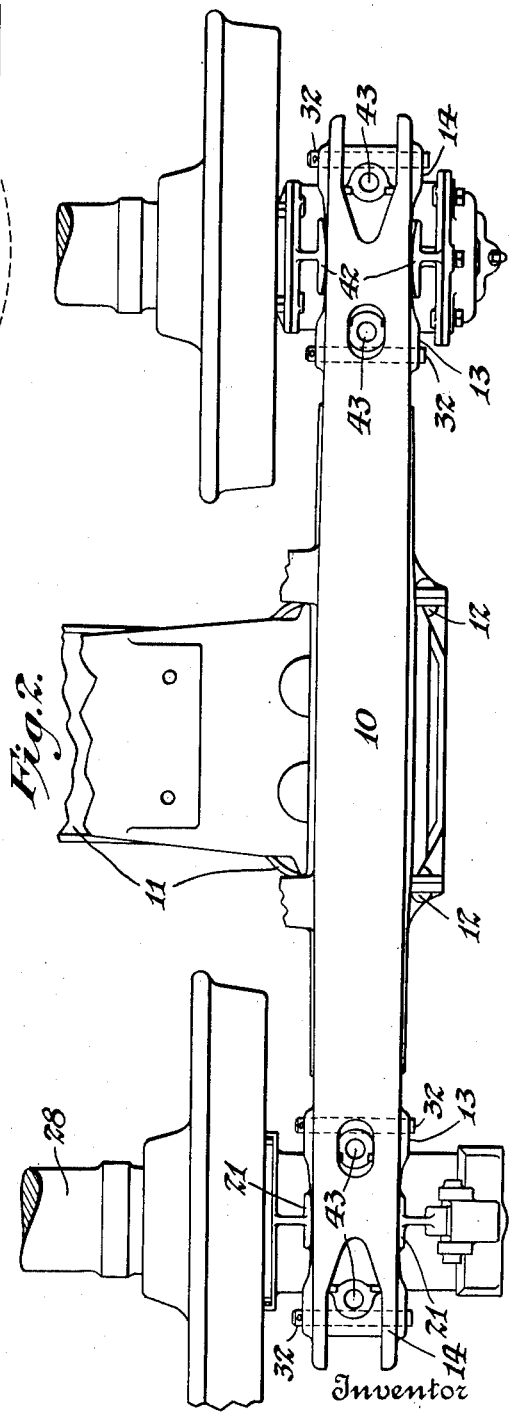
Inventor
Albert O. Buckius
By his Attorney
Clarence D. Kerr

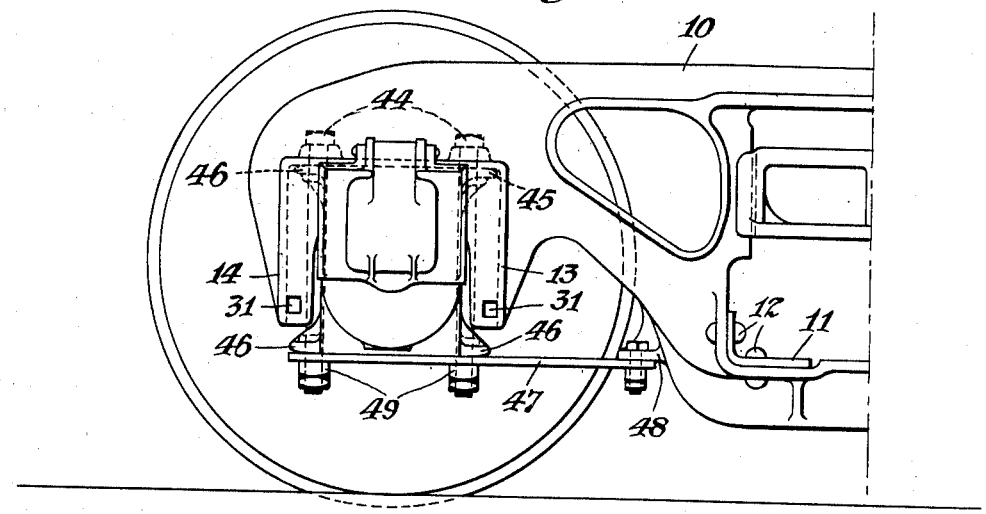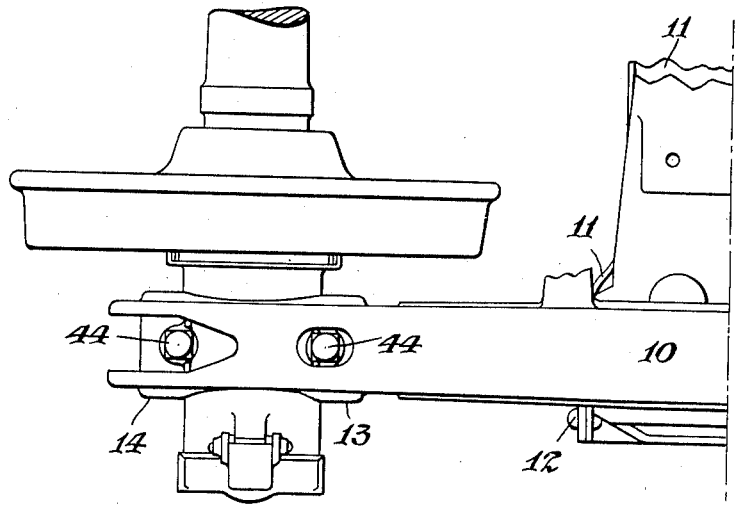

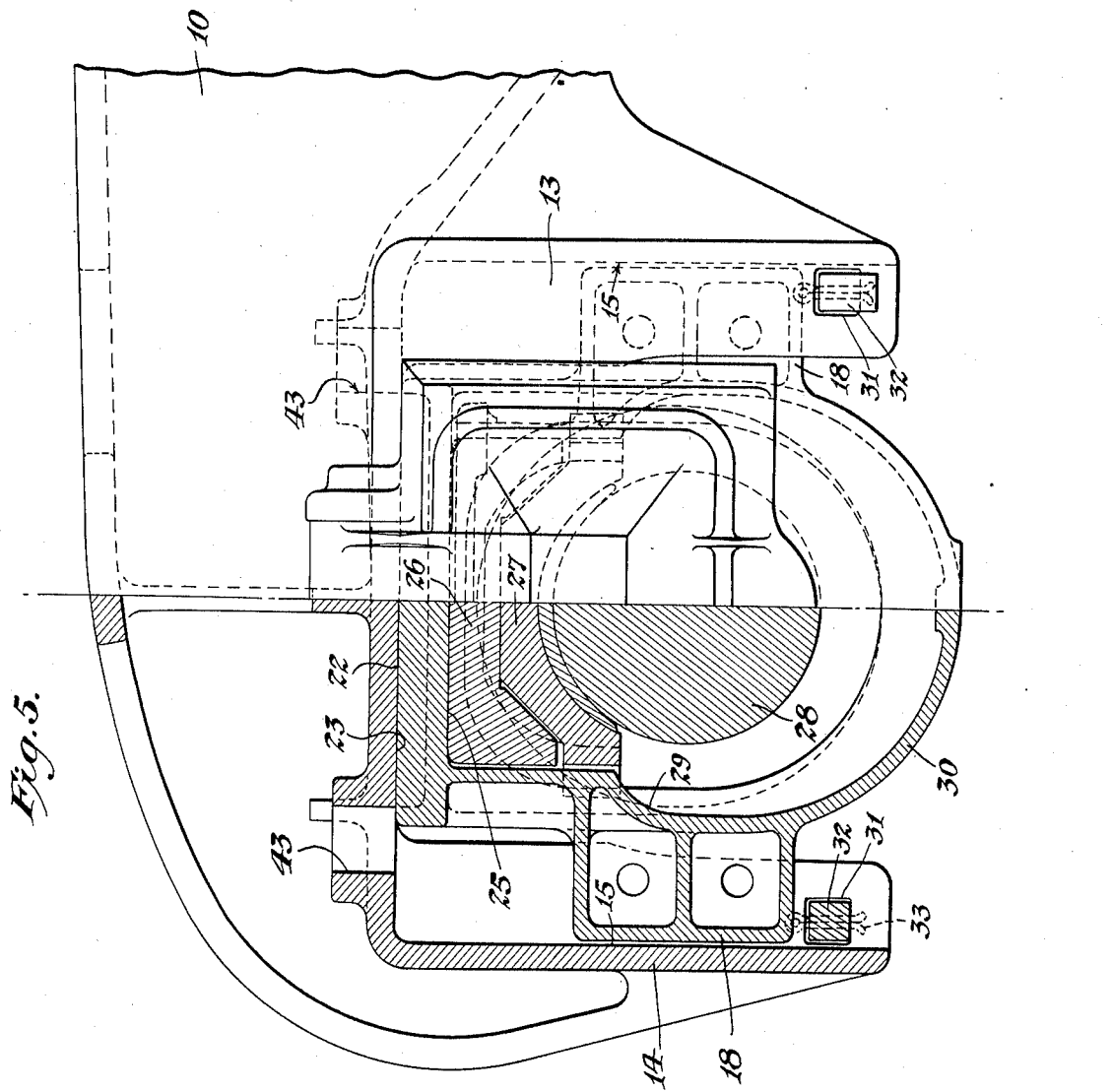

June 12, 1934.  A. O. BUCKIUS  1,962,579
SIDE FRAME AND JOURNAL BOX THEREFOR
Filed Dec. 31, 1930  6 Sheets-Sheet 4
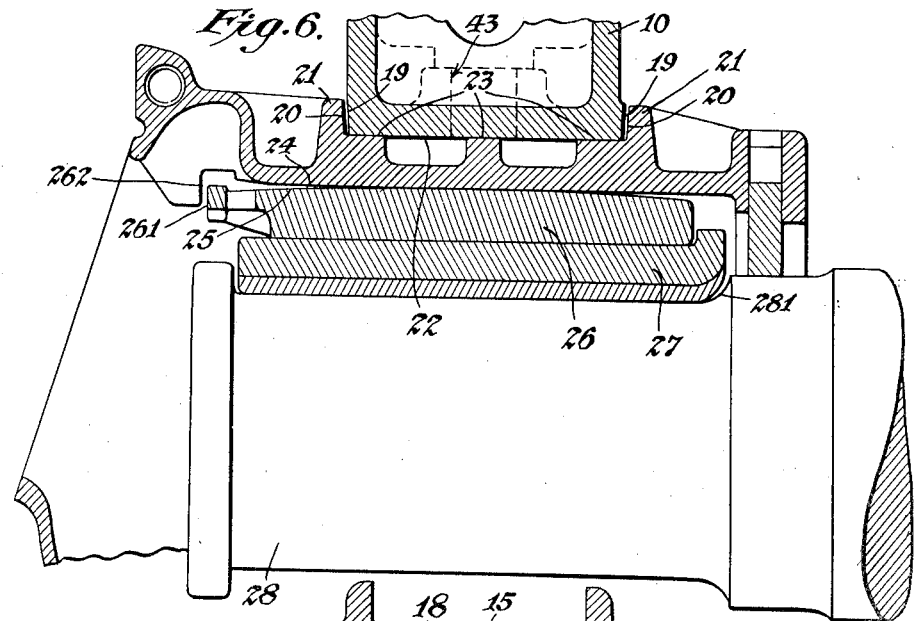
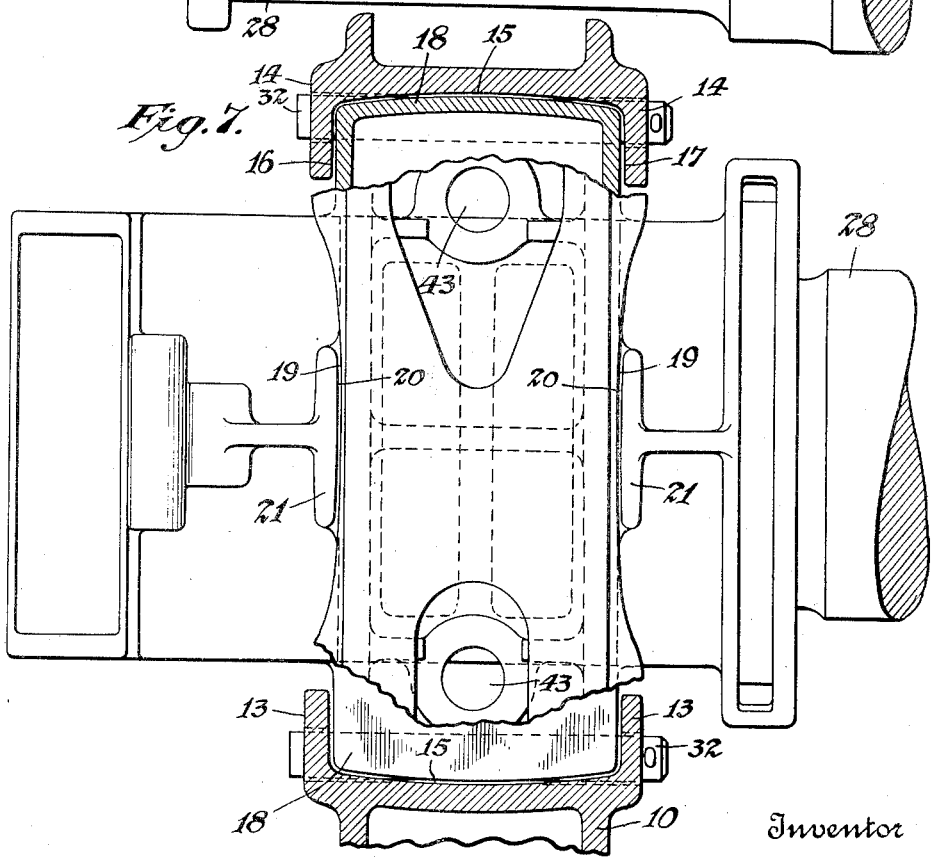
Inventor
Albert O. Buckius
By his Attorney
Clarence D Kerr

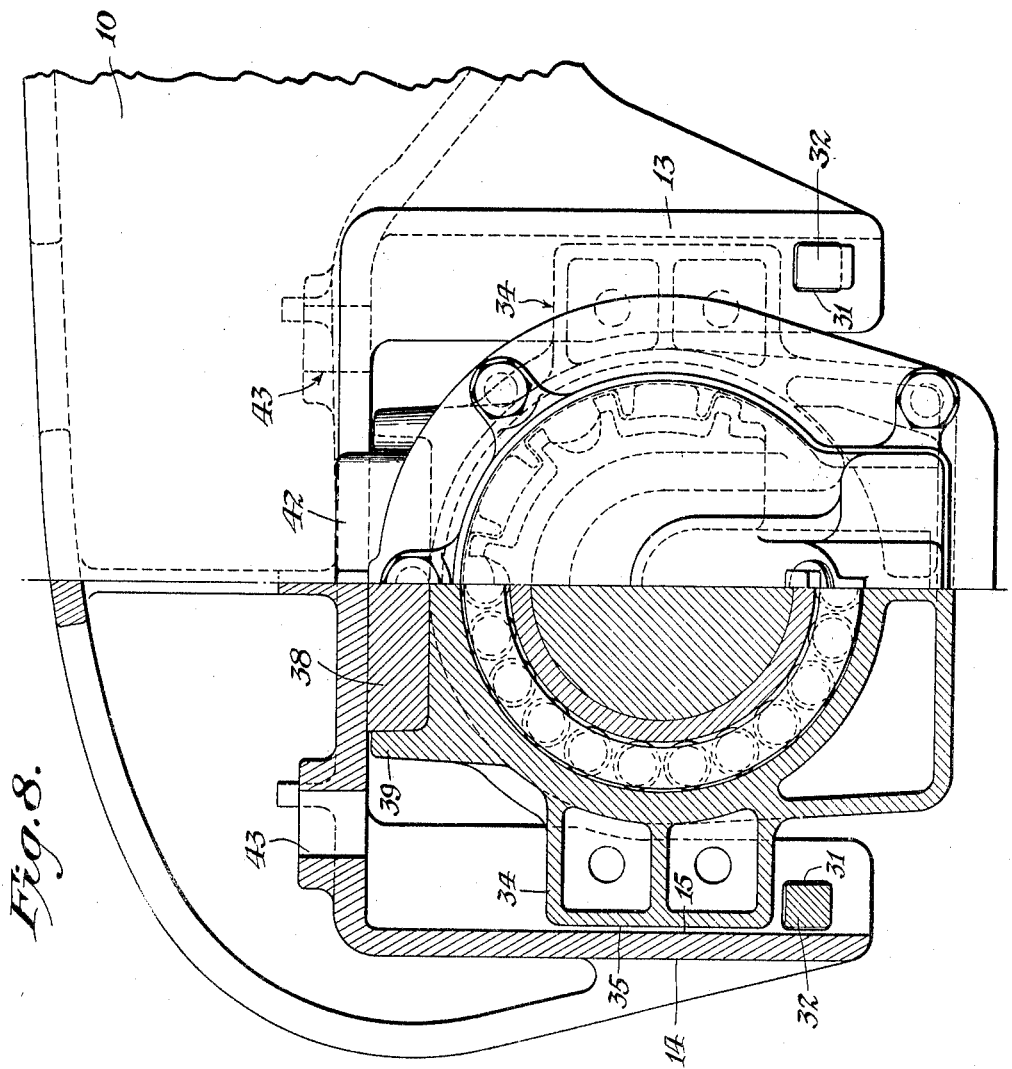

June 12, 1934.  A. O. BUCKIUS  1,962,579
SIDE FRAME AND JOURNAL BOX THEREFOR
Filed Dec. 31, 1930    6 Sheets-Sheet 6

Inventor
Albert O. Buckius
By his Attorney
Clarence Kerr

Patented June 12, 1934

1,962,579

UNITED STATES PATENT OFFICE 1,962,579

SIDE FRAME AND JOURNAL BOX THEREFOR

Albert O. Buckius, Cleveland, Ohio, assignor to National Malleable and Steel Castings Company, Cleveland, Ohio, a corporation of Ohio Application December 31, 1930, Serial No. 505,686

6 Claims. (Cl. 105—220)

This invention relates to side frames and journal boxes employed in car trucks and particularly to improvements in the cooperating features of such frames and journal boxes which are adapted to be detachably connected.

The American Railway Association has adopted a regulation which will compel the railroads to discontinue the use of arch bar side frames on cars used in interchange and to replace them by cast steel frames within a limited time. At the same time there is a present tendency toward the adoption of roller bearing journal boxes by the railroads. In many instances the railroads which are now compelled to change over from the arch bar frame to the cast steel frame are not yet in a position to adopt the roller bearing journal box but may in the future find it desirable to do so. These roads now have on hand a large number of plain bearing boxes of the arch bar type which will be usable to a considerable extent after the use of the arch bar side frame must be discontinued. It has been an object of the present invention to devise a journal box of the plain bearing type which may be readily and economically constructed and may be applied with greater facility than the arch bar boxes to a cast steel side frame which is adapted also to receive a roller bearing box. In the attachment of the ordinary arch bar box to the frame a pair of bolts are provided, these passing downwardly through suitable openings in the frame and being connected at their lower ends to a tie bar which is secured to the frame and extends beneath the box. These fastening bolts frequently become bent or rusted or have their threads mutilated in some way so that they must be discarded and replaced from time to time.

The box contemplated by the present invention eliminates the necessity for such fastening bolts as well as the tie bar and utilizes the pedestals provided for the support of the roller bearing boxes to assist in mounting the new plain bearing box in the frame. This construction is less expensive than the arch bar box construction with its bolts and is more satisfactory from various standpoints. For example it is much simpler to remove. The removal of rusted bolts, when it is desired to take out an arch bar box, requires so much time that the expense involved in the making of repairs is considerably increased. Furthermore, the weight of the extra attaching means, including the pair of bolts and tie rod, which is added for each arch bar box applied to a car will amount to between 30 and 50 pounds.

A further feature of the invention is the provision of a frame and journal box construction which permits of the interchange of three different types of boxes in the same frame. Thus the cast steel frame of the present invention is not only adapted to receive the old arch bar type of journal box, but also a new type of plain bearing journal box more particularly suited to the frame and a roller bearing type of journal box. This will enable the railroads to continue the use of the old arch bar boxes which are still in good condition after the frame replacement program has been carried out and to provide additional plain bearing boxes of the new type to supply the deficiency of the older boxes. When it is later desired to substitute roller bearing boxes, this may be readily done without any additional side frame expense. Furthermore, should an installed roller bearing box, for example, require replacement at a shop not provided with a spare box of this type, either an old arch bar box or the new plain bearing box with the associated axle and wheels may be substituted. In the event of a shortage of the bolts required for the old boxes, it will be found advantageous to use the new plain bearing box which employs the same sort of attaching means as a roller bearing box.

The relation between the side frame and the various journal boxes is such that a substantially inflexible connection is provided between the frame and plain bearing boxes of either type while a flexible connection permitting both vertical and lateral angling is provided between the frame and roller bearing box.

An advantage of the frame construction contemplated, which permits of detachable connection of the various forms of boxes, is that it enables the riveting of the spring plank to the side frames. This is not possible in constructions in which the boxes are made integral with the frames since the removal of the boxes from the journals, that is occasionally required, necessitates the separation of the frames in this type of construction. Riveting of the spring plank, made possible in accordance with the present invention, results in a more rigid truck construction in which the side frames are less apt to shift out of their proper relative positions. Shifting of the frames in the looser constructions is considered to be in a large part responsible for the derailment of car trucks.

Other features and advantages of the invention will appear from the detailed description of an illustrative embodiment of the same which will now be given in conjunction with the accompanying drawings in which:

Figure 1 is an elevational view of the side frame showing a roller bearing journal box applied at the right end and the new plain bearing journal box applied at the left end.

Figure 2 is a plan view of the construction shown in Figure 1.

Figure 3 is an elevational view of one end of the side frame showing its relation to an arch-bar type of journal box.

Figure 4 is a plan view of the construction shown in Figure 3.

Figure 5 is an enlarged view partly in section and partly in elevation showing the relation of one end of the side frame to the new type of plain bearing journal box.

Figure 6 is a longitudinal, vertical section taken through the journal box disclosed in Figure 5 showing its relation to the side frame and the journal.

Figure 7 is a plan view partly in section of the construction shown in Figure 6.

Figure 8 is a view partly in vertical section and partly in elevation showing the relation of a roller bearing journal box to the pedestals of the side frame.

Figure 9:
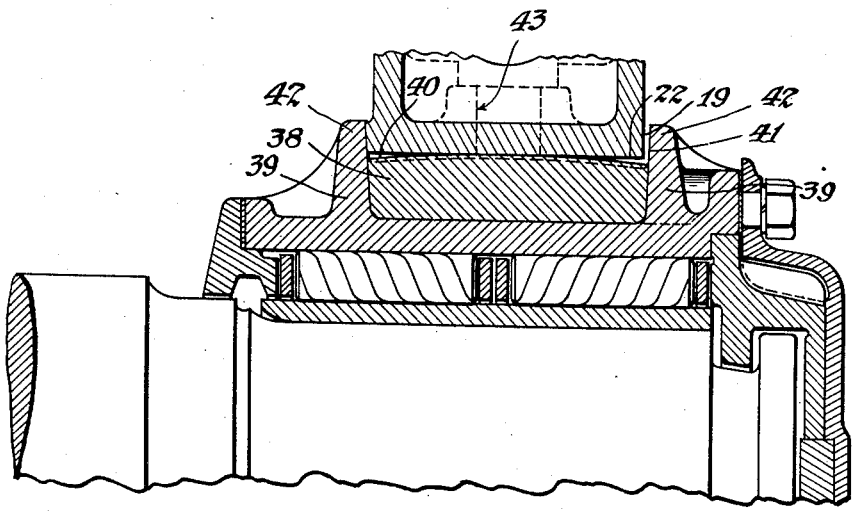
Figure 9 is a longitudinal, sectional view through the upper portion of a roller bearing journal box showing its relation to the side frame.

Referring now to the drawings, there is shown in Figure 1 a side frame 10 which constitutes one side of a car truck structure. A similar frame is arranged parallel to the one illustrated and on the opposite side of the car truck, the two frames being joined by means of a spring plank 11. Due to the detachable mounting of the journal boxes in the side frames, as contemplated by the present invention, the spring plank may be permanently secured to the two side frames by means of rivets 12, or the like. At each end of the side frame 10 there is provided a pair of pedestals 13 and 14 between which any one of three different types of journal boxes may be mounted. In Figure 1 the left end of the frame is shown as having applied thereto a plain bearing journal box of the new type, contemplated by the present invention, and at its right end a roller bearing journal box. The pedestals 13 and 14 are provided with vertically disposed, curved surfaces 15 (Figs. 7 and 10) on their inner opposed sides and flange extensions 16 and 17 extending inwardly toward the journal. Within the channel form provided by the surfaces 15, 16 and 17 of each pedestal there is adapted to be fitted a side lug 18 formed integrally with the new plain bearing journal box. It will be understood that the pedestals on either side of the box are of similar interior construction and that the box is provided with a lug on each side for cooperation in the same way with the two pedestals. The end surfaces of the lugs 18 which cooperate with the surfaces 15 on the pedestals are curved, as shown in Figure 7, in a direction longitudinal of the axle but are straight in a vertical direction, as more clearly illustrated in Figure 1. The dimension of the lugs 18 is such as to permit the journal box to be readily inserted between the pedestals but when inserted the box fits quite snugly with very little clearance opposite the surfaces 15, 16 and 17 so that relative angular movement is substantially prevented.

Directly over the journal box the frame is provided with slightly curved surfaces 19 on each side, which are adapted to cooperate with similar slightly curved surfaces 20 carried by vertically extending lugs 21 integral with the top of the journal box. The surfaces 19 and 20 are preferably inclined slightly to the vertical, as shown in Figure 6, and the arrangement is such that a relatively snug fit is provided between the lugs and the side frame. The horizontal, downwardly facing surface 22 of the frame is preferably flat and adapted to cooperate with a flat surface 23 at the top of the box. The cooperation between the surfaces 22 and 23 is such that relative, vertical angling between the box and the side frame is substantially prevented. The general relation between the side frame and box, therefore, is such as to establish a relatively inflexible connection between the two.

The interior construction of the box illustrated in Figures 5, 6 and 7 is substantially the same as the old arch-bar type, plain bearing journal box. The inner surface 24 at the top of the box is preferably flat and adapted to cooperate with the upper surface 25 of a wedge 26. The surface 25 is curved, as shown in Figure 6, in the direction of the axis of the journal and is straight in a transverse direction, as shown in Figure 5. A brass 27 is provided in the usual way between the wedge and a journal 28. The upper interior portion of the box is, as stated, substantially the same as the old arch-bar type of box and has the same relation to the wedge and brass. At a point substantially in line with the lower edge of the brass, however, the wall of the box is curved outwardly as indicated at 29 in Figure 5 so as to provide an enlargement of the interior of the box at this point. Side lugs 18 extend outwardly from a point adjacent the surfaces 29. The lower portion of the box is free from laterally extending flanges and is provided simply with a rounded bottom 30. In order to retain the box within the side frame when the truck is lifted from the track, for example, the side flanges of the pedestals are provided with aligned, preferably square, openings 31 adapted to receive retaining pins 32 of corresponding cross section having an enlarged head at one end and adapted to receive a cotterpin at the opposite end.

It will be observed that the thrusts of the axle transmitted to the journal box are resisted both by the surfaces 19 in cooperation with the projections 21 at the top of the box and by the surfaces 16 and 17 of the pedestals in cooperation with the side lugs 18. The thrusts are accordingly resisted by surfaces both above and below the line along which the thrust is imparted to the journal box. Thus considering the more important outward thrusts transmitted by the shoulder 281 of the axle to the brass and wedge and by the extension 261 of the latter to the shoulder 262 within the box, these are resisted above the line of thrust by engagement of the surfaces 19 and 21 and below the line of thrust by the engagement of the side lugs with the surfaces 16, the latter engagement being horizontally in line with the axle. Any tendency of the box to angle vertically will be resisted by cooperation of the same surfaces.

Figure 10:
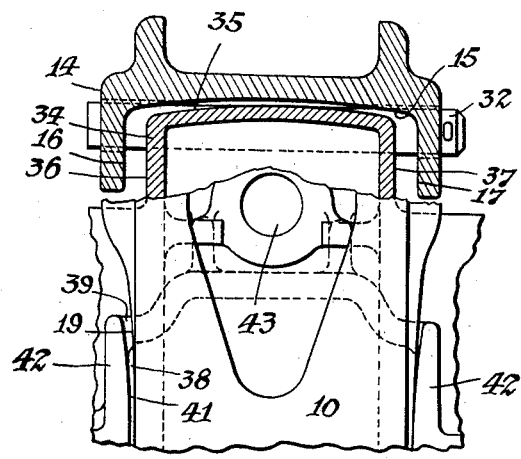
Figure 10 is a plan view partly in section showing the relation between the roller bearing journal box and the pedestals of the side frame.

Referring now to Figures 8, 9 and 10, it will be seen that a quite similar arrangement is provided for retaining the roller bearing journal box in position in the side frame. There are, however, certain differences in the construction and relation of the parts which will be pointed out. Side lugs 34, similar to the side lugs 18, extend laterally from the roller bearing journal box and these lugs are provided with vertically extending surfaces 35 adapted to cooperate with the surfaces 15 of the pedestals. For this purpose the surfaces 35 are straight in a vertical direction but are arcuate or curved in a direction longitudinal of the axis of the journal to correspond with the curvature of the surfaces 15. The over-all dimension between the surfaces 35 at the opposite sides of the roller bearing journal box is somewhat less than the corresponding dimension of the plain bearing journal box shown in Figures 5 and 7. This is for the purpose of providing a greater clearance between the side lugs and the surfaces 15 of the pedestals so as to allow for a relative lateral angling movement between these parts and, if desired, even a relative bodily movement between them. So also the side surfaces 36 and 37 of the lugs 34 are spaced sufficiently from the surfaces 16 and 17 of the pedestals to enable relative, lateral movement between the lugs and pedestals as the parts are angled with respect to each other.

At the top of the roller bearing journal box there is preferably provided a bearing block 38 in the form of a plate of hard wear resisting material seated on the top of the box and held tightly in place by a surrounding rib 39. It will be understood, however, that in some applications of the invention the bearing may be provided by an integral portion of the box. The block 38 is provided with an upper surface 40 adapted to cooperate with the under surface 22 of the frame. In order to permit vertical angling of the box in a direction longitudinal of the axis of the journal, the surface 40 is arcuately formed or curved in the direction of this axis but is straight in a direction transverse of the axis. As shown in Figure 9, a slight clearance is provided between one or the other of the faces 19 of the side frame and cooperating faces 41 on extensions 42 of the rib 39. In the assembly of the structure this clearance is preferably provided as shown in Figure 9. The surfaces 41, furthermore, are inclined slightly to the vertical to correspond with the inclination of the surfaces 19. This arrangement is such that vertical angling to a desirable extent is permitted between the frame and the roller bearing journal box. To allow for lateral angling between the frame and box, the surfaces 41 of the extensions 42 are arcuately formed or curved in a direction longitudinal of the frame for cooperation with the surfaces 19 of the frame, these being of lesser curvature than the surfaces 41. Lateral angling between the frame and box is therefore permitted not only by this construction but also by the relation between the side lugs 34 and the pedestals, as previously explained. It should be noted, on the other hand, that in the plain bearing box shown in Figure 7 the curvature of the cooperating surfaces 19 and 20 is substantially the same inasmuch as no angling between these surfaces is desired.

In order to adapt the side frame for the reception of the old arch-bar type of box, suitable bolt holes 43 are formed in the horizontal flange of the frame, these holes being adapted to receive the attaching bolts 44. The bolts 44 are adapted to be passed through laterally extending flanges 45 at the top of the arch-bar box and similar flanges 46 at the bottom of the box. A tie-bar 47 adapted to be bolted or otherwise secured to a lug 48 integral with the side frame may be extended beneath the journal box and may be provided with openings adapted to receive the lower ends of the bolts 44. Nuts 49 may be provided at the lower ends of the bolts to clamp the box in position on the frame. It will be apparent that this construction is such that the arch box is substantially rigidly retained in the frame.

In accordance with the present invention, there is thus provided a side frame which is adapted to receive any one of three different types of boxes, two for substantially inflexible connection with the frame and one for flexible connection with the frame. Two of the boxes are adapted to be retained in the frame by the use of the same pins 32.

While one admirable form of the invention has been set forth in considerable detail in the foregoing, it is to be understood that various changes may be made in the details of construction and the arrangement of the parts without departing from the general spirit and scope of the invention as embraced by the appended claims.

What I claim is:

1. In a car truck a side frame having pedestals with inwardly extending flanges, a plain bearing journal box having side lugs cooperating with said pedestals, said pedestals having vertically extending curved walls adapted with the inner surfaces of said flanges to snugly engage corresponding surfaces on said lugs, said frame being constructed also to receive a roller bearing box, said flanges and curved surfaces permitting angling between said frame and said roller bearing journal box, and means receivable by said pedestals for cooperation with said side lugs to retain said plain bearing box in said frame.

2. A side frame for a car truck which comprises a main body having a pair of pedestals permanently secured thereto, said pedestals being spaced to receive a journal box, said pedestals having vertically extending curved faces opposed to each other and adapted to either snugly cooperate with side lugs on a plain bearing journal box or loosely cooperate with said side lugs on a roller bearing journal box, said frame having a flat horizontally disposed surface extending from side to side of said frame adapted to cooperate with the top of either type of box.

3. A unitary side frame for a car truck which comprises a pair of pedestals spaced to receive a journal box, said pedestals having vertically extending curved faces opposed to each other and adapted to either snugly cooperate with side lugs on a plain bearing journal box or loosely cooperate with said side lugs on a roller bearing journal box, said frame having a flat horizontally disposed surface extending from side to side of said frame adapted to cooperate with the top of either type of box, and having vertically disposed surfaces at the sides of said first mentioned surface so arranged as to cooperate with projections at the tops of said boxes.

4. A plain bearing journal box adapted to receive an axle having thrust bearing surfaces at the top and at the sides for cooperation with thrust receiving surfaces on the frame, said thrust bearing surfaces being respectively above and below the line of thrust transmitted to said box, and said surfaces at the side being formed on hollow lugs protruding from the sides of the box horizontally opposite the axle.

5. In a car truck a side frame having pedestals with inwardly extending flanges, the inner edges of said flanges being spaced sufficiently to receive an arch bar type of box therebetween, a plain bearing journal box having side lugs cooperating with said pedestals, said pedestals having vertically extending curved walls adapted with the inner surfaces of said flanges to snugly engage corresponding surfaces on said lugs, said frame being constructed also to receive a roller bearing box, said flanges and curved surfaces permitting angling between said frame and said roller bearing journal box, and means receivable by said pedestals for cooperation with said side lugs to retain said plain bearing box in said frame.

6. In a car truck a side frame having pedestals with inwardly extending flanges, the inner edges of said flanges being spaced sufficiently to receive an arch bar type of box therebetween, a plain bearing journal box having side lugs cooperating with said pedestals, said pedestals having vertically extending curved walls adapted with the inner surfaces of said flanges to snugly engage corresponding surfaces on said lugs, said frame being constructed also to receive a roller bearing box, said flanges and curved surfaces permitting angling between said frame and said roller bearing journal box.

ALBERT O. BUCKIUS.